US011879611B2

(12) United States Patent
Cramer et al.

(10) Patent No.: US 11,879,611 B2
(45) Date of Patent: Jan. 23, 2024

(54) LIGHT MODULE WITH A BULB SHIELD AND METHOD FOR FASTENING A BULB SHIELD IN A POSITION PRECISELY

(71) Applicant: Hella GmbH & Co. KGaA, Lippstadt (DE)

(72) Inventors: Herbert Cramer, Rüthen (DE); Simone Rohrberg, Lippstadt (DE); Christian Schimon, Lippstadt (DE); Alexander Schwan, Kamen (DE); Dirk Schwemin, Lippstadt (DE); Frank Sohrweide, Lippstadt (DE); Christian Wieck, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/323,171

(22) Filed: May 24, 2023

(65) Prior Publication Data

US 2023/0383921 A1 Nov. 30, 2023

(51) Int. Cl.

| | |
|---|---|
| ***F21S 41/29*** | (2018.01) |
| ***F21S 41/47*** | (2018.01) |
| ***F21S 41/43*** | (2018.01) |
| ***F21S 41/143*** | (2018.01) |
| ***F21S 41/27*** | (2018.01) |

(52) U.S. Cl.

CPC ............. *F21S 41/47* (2018.01); *F21S 41/143* (2018.01); *F21S 41/27* (2018.01); *F21S 41/43* (2018.01)

(58) Field of Classification Search

CPC ............ F21S 41/29; F21S 41/25; F21S 45/47; F21S 41/143; F21S 41/19; F21S 45/49; F21V 17/101

See application file for complete search history.

(56) References Cited

U.S. PATENT DOCUMENTS

| | | | | |
|---|---|---|---|---|
| 9,593,819 B2 * | 3/2017 | Sano | ........................ | F21S 41/43 |
| 10,495,276 B2 * | 12/2019 | Nakao | .................... | F21S 41/663 |
| 2013/0135885 A1 * | 5/2013 | Anzai | .................... | F21S 41/151 362/511 |
| 2016/0146423 A1 * | 5/2016 | Lai | .......................... | F21S 41/19 362/520 |

FOREIGN PATENT DOCUMENTS

| | | | |
|---|---|---|---|
| DE | 19843816 | A1 | 3/2000 |
| DE | 102007050893 | A1 | 4/2009 |
| DE | 102012213841 | A1 | 2/2014 |
| DE | 102014103379 | A1 | 9/2015 |
| DE | 102010045435 | B4 | 10/2019 |

* cited by examiner

*Primary Examiner* — Elmito Breval

(74) *Attorney, Agent, or Firm* — Husch Blackwell LLP

(57) ABSTRACT

A light module is provided with a bulb shield. The light module includes a light generation unit for emitting light and an optic for shaping the light emitted by the light generation unit. The light generation unit includes a light-emitting surface. A bulb shield is arranged between the optic and the light generation unit for covering the light generation unit. The bulb shield includes a passage for the light emitted by the light-emitting surface. The light module includes a bearing structure for the bulb shield. The bulb shield is glued to the bearing structure by a first adhesive bond and the bulb shield is glued to the bearing structure by a second adhesive bond. A first adhesive used to produce the first adhesive bond and a second adhesive used to produce the second adhesive bond are different.

10 Claims, 8 Drawing Sheets

LIGHT MODULE WITH A BULB SHIELD AND METHOD FOR FASTENING A BULB SHIELD IN A POSITION PRECISELY

CROSS REFERENCE

This application claims priority to German Application No. 102022113252.8, filed May 25, 2022, the entirety of which is hereby incorporated by reference.

FIELD OF THE INVENTION

The present invention relates to a light module with a bulb shield and a method for fastening a bulb shield in a position precisely. The present invention relates in particular to a light module for an illumination device of a vehicle, in particular for a projection headlamp of a vehicle.

BACKGROUND OF THE INVENTION

Projection headlamps for vehicles are known from the current state of technology. For example, DE 10 2010 045 435 B4 discloses a projection headlamp for a motor vehicle.

Due to the constantly increasing quality of the optic and optic components as well as the use of ever more complex light generation units, the problem arises in practice that insolation on the light module can lead to damage to the light-emitting light generation unit. In particular when using high-resolution LEDs, for example in the form of an LED array or an LED matrix, it has become apparent that there is a danger of such light generation units being damaged by insolation or insolation can lead to a significantly reduced light performance by these light generation units. Printed circuit boards, frames and further components of light generation units may need to be protected from insolation in order to ensure a long service life. In order to protect the light generation unit from insolation that enters the light module through the optic and to achieve the greatest possible luminous efficiency from the light emitted by the light generation unit, a current internal state of the technology provides for positioning a bulb shield between the optic and the light generation unit for covering the light generation unit. The bulb shield features a passage for the light emitted by the light generation unit. Fastening the bulb shield in a position precisely in relation to the light generation unit in order to achieve maximum luminous efficiency while maintaining especially good protection of the light generation unit poses a problem. Due to manufacturing tolerances, it is consequently necessary to optimally position the passage of the bulb shield to a light-emitting surface of the light generation unit and to permanently fasten it in this optimal position.

BRIEF SUMMARY OF THE INVENTION

The task of the present invention is to specify a light generation unit with a bulb shield that features a high luminous efficiency while ensuring good protection of the light generation unit from insolation. Further, the task of the invention is to specify a method for fastening the bulb shield in a position precisely. These tasks are solved by the objects of the independent patent claims. Advantageous embodiments are the object of the independent claims.

The inventive light module acts as a light module for an illumination device of a vehicle. In particular, the light module is employed in a headlamp, for example a projection headlamp, of a motor vehicle. The light module features a light generation unit for emitting light and an optic for shaping the light emitted by the light generation unit. The light generation unit features a light-emitting surface, where a bulb shield is arranged between the optic and the light generation unit for covering the light generation unit. The bulb shield features a passage for the light emitted by the light-emitting surface. The light module features a bearing structure for the bulb shield, where the bulb shield is glued to the bearing structure by means of a first adhesive bond and where the bulb shield is glued to the bearing structure by means of a second adhesive bond, where a first adhesive used to create the first adhesive bond and a second adhesive used to create the second adhesive bond are different.

The use of adhesive bonds provides the advantage that through the use of adhesive bonds, the bulb shield can be positioned precisely relatively freely in relation to the light-emitting surface and subsequently fastened precisely to the bearing structure in this precise position by means of the adhesive. When using adhesives, the problem arises that, depending on the adhesive used, the adhesive bonds feature different properties. For example, shrinkage while the adhesive cures can cause shifts in the position of the bulb shield in relation to the light-emitting surface, which causes a deterioration in the later light result when the adhesive has cured as the shrinkage of the adhesive has led to a shift in position as the adhesive cured. This means that structural adhesives or construction glues are frequently used to achieve a permanent and long-term stable adhesion; these are frequently multi-component adhesives. The disadvantage with many structural adhesives or construction glues, in particular multi-component adhesives is that they frequently have a relatively long curing time. This poses the problem that the bulb shield would have to be held precisely in the position for a relatively long time to avoid a misalignment of the bulb shield. This leads to relatively long production cycle times. Fast curing adhesives such as UV-curing adhesives that make a short production cycle possible frequently have the disadvantage that they are not long-time stable and may not feature the necessary chemical resistance. Producing a first adhesive bond with a first adhesive and a second adhesive bond with a second adhesive makes it possible to exploit the advantages of the respective first adhesive and compensate for the disadvantages of the respective adhesive with the other adhesive.

For example, the first adhesive or the first adhesive bond can be used to fix the bulb shield precisely in its position in relation to the light-emitting surface. As soon as the bulb shield is fixed, any positioning tool can be removed as the first adhesive bond that is then in place prevents any misalignment of the bulb shield in relation to the light-emitting surface. The second adhesive can then be applied and cured to create the second adhesive bond that brings about a permanent fastening of the bulb shield to the bearing structure.

With regard to the shortest possible production cycle, it is deemed to be especially advantageous if the adhesive of the first adhesive bond is a relatively fast curing adhesive and where the second adhesive of the second adhesive bond is a relatively slow curing adhesive. In this context, "relatively fast" and "relatively slow" is understood as the first adhesive curing faster than the second adhesive or the second adhesive curing more slowly than the first adhesive. It is deemed to be especially advantageous for the first adhesive to cure within 3 to 15 seconds. This can be achieved, for example, with a UV-curing adhesive.

It is deemed to be especially advantageous for the first adhesive of the first adhesive bond to be a light-curing adhesive, in particular a UV-curing adhesive. The use of a light-curing adhesive provides the advantage that the adhesive only cures when it is subject to light of a certain wavelength. Correspondingly, the first adhesive can be applied without it starting to cure immediately. This make it possible to still correct the position of the bulb shield in relation to the light-emitting surface once the adhesive has been applied, and only then to cure the adhesive by irradiating it with light of a suitable wavelength. By focusing such light in the corresponding manner, it is further possible to achieve a very exact first adhesive bond with regard to its position and extent.

The second adhesive is preferentially a multi-component adhesive. The second adhesive can be, in particular, a silicone adhesive. The second adhesive can also be an epoxy adhesive.

The light-emitting surface is formed in particular by one or more light-emitting diodes (LEDs). In particular, the light generation unit features a light source carrier in the form of a rigid printed circuit board, where an LED array and/or an LED matrix is/are arranged on the printed circuit board. To achieve the emission of white light, the light-emitting diodes or the light-emitting surface can feature a suitable coating, for example a phosphoric coating.

It is deemed to be especially advantageous for the bearing structure to be fixed in position in relation to the light-emitting surface.

In particular, the bearing structure is a component of a carrier frame, where the light generation unit is mounted on a bearing in the carrier frame. In particular, the printed circuit board of the light generation unit is mounted on a bearing in the carrier frame.

The bulb shield is preferentially a component made of metal or a sheet metal component.

Preferentially, the bulb shield is designed to be plate-shaped. It is deemed to be especially advantageous for the bulb shield to feature a thickness of 0.05 mm to 1.5 mm.

To achieve an especially high luminous efficiency and a low-level of reflections in the area of the passage while maintaining sufficient stability of the bulb shield, it is deemed advantageous for the bulb shield to feature a smaller thickness in an inner area adjacent to the passage than in an outer area surrounding the inner area. The inner area features preferentially a thickness of between 0.05 mm and 0.2 mm, preferentially between 0.05 mm and 0.1 mm. The outer area features preferentially a thickness of between 0.1 mm and 1.5 mm.

The bulb shield is preferentially at a distance from the light-emitting surface. The distance is preferentially up to 2 mm. Preferentially, the distance is between 0.5 mm and 1.0 mm.

The surfaces of the bulb shield preferentially feature a low reflectivity. This can be achieved, for example, by the bulb shield being correspondingly anodized or for a corresponding coating to be applied.

The geometry of the passage is preferentially adjusted to the geometry of the light-emitting surface. The light-emitting surface and the passage of the bulb shield take the form of, for example, an elongated rectangle. Oval shapes are also conceivable.

The dimensions of the passage are preferentially slightly smaller than the dimensions of the light-emitting surface.

Preferentially, the light-emitting surface, for example, the LEDs, are, at least in sections, surrounded by a sealant. This sealant can, for example, serve as a frame for the light-emitting surface, in particular the LEDs and/or to protect bonding wires. The sealant can, for example, be a silicone sealant. In order to protect the silicone sealant from insolation, it is deemed advantageous for the bulb shield to cover the sealant.

Preferentially, the first adhesive and/or the second adhesive are applied on a front of the bulb shield facing away from the light generation unit and thus not between a back facing away from the front and the bearing structure. If the first and/or the second adhesive is applied between a back facing away from the front and the bearing structure, there is a particularly great danger of the bulb shield shifting position during the process of curing or shrinkage. This is avoided by applying the first adhesive or, as the case may be, the second adhesive on the front of the bulb shield. In this context, it is deemed especially advantageous for the adhesive bond between the bulb shield and the bearing structure to be formed by the existence of the adhesive bond between the front of the bulb shield and an area of the bearing structure laterally adjacent to the bulb shield.

A further advantage of applying the adhesives to the front of the bulb shield is that it is especially easy to apply the respective adhesive.

Furthermore, it is deemed to be especially advantageous for the second adhesive bond to cover the first adhesive bond on a side facing the optic. This protects the usually more sensitive first adhesive bond against external influences, for example against the penetration of oxygen, thus avoiding the destruction of or changes to the first adhesive bond. In this context, it is deemed especially advantageous for the first adhesive bond to be encapsulated in the second adhesive bond.

It is deemed to be especially advantageous for the bulb shield to make direct contact with a contact surface of the bearing structure at a lower side of the bulb shield facing towards the light generation unit. This specifies or defines the axial distance of the bulb shield from the light generation unit especially precisely. This embodiment avoids any change in the axial position caused by the introduction of adhesive and/or shrinkage of the adhesive.

It is deemed to be especially advantageous for the first adhesive bond to be formed by spot bonding at several places. Spot bonding provides the advantage that the spots can be applied and cured especially quickly. Furthermore, spot bonding has the advantage that as long as the first adhesive has not cured, little effort is needed to move the bulb shield in order to position it precisely. In a preferential embodiment, it is intended for the first adhesive bond to feature at least two bonding spots, in particular exactly three bonding spots.

It is deemed advantageous for the second adhesive bond to feature one or more strip-shaped or linear adhesive bonds. It is deemed to be especially advantageous for the first adhesive bond and/or the second adhesive bond to be applied or formed on two opposite sides of the bulb shield. Preferentially, the second adhesive bond extends over the entire length of two opposite outer edges of the bulb shield.

In a preferential embodiment, it is intended for the bearing structure to feature one or several indentations to accommodate the first adhesive, where the respective indentation protrudes laterally in a line of sight onto the front of the bulb shield facing away from the light generation unit opposite an outer edge of the bulb shield. Such a design facilitates especially precise introduction of the first adhesive. Furthermore, such an indentation has the advantage that when introducing the first adhesive, ingress of the first adhesive into an area between the contact face of the bearing structure and the back of the bulb shield is avoided. This makes it possible to avoid a shift in position in an axial direction and/or tilting of the bulb shield when introducing and curing the first adhesive. In this respect, it is deemed especially advantageous for the first adhesive not to completely fill the indentation or fill it to the rim. Correspondingly, it is intended for there to be a space between the edge of the respective indentation and the edge of the first adhesive bond. This avoids any adhesive creeping between the lower side of the bulb shield and the bearing structure due to capillary forces.

In connection with indentations, it is deemed especially advantageous for the bulb shield to partially cover the respective indentation insofar as the indentation extends under the bulb shield.

The method of precisely fastening a bulb shield in position in relation to a light-emitting surface of a light generation unit of a light module features at least the following process steps:

a. provision of a bearing structure, where the light-emitting surface is fixed in position in relation to the bearing structure,
b. provision of the bulb shield, where the bulb shield features a passage for the light emitted by the light-emitting surface,
c. introduction of the bulb shield into the bearing structure,
d. positioning of the passage of the bulb shield precisely in relation to the light-emitting surface of the light generation unit,
e. production of a first adhesive bond between the bulb shield and the bearing structure by applying and curing a first adhesive,
f. production of a second adhesive bond between the bulb shield and the bearing structure by applying and curing the second adhesive.

It is intended for the curing of the first adhesive to take place prior to the curing of the second adhesive.

It is deemed especially advantageous for the second adhesive not to be applied until the first adhesive has cured.

It is deemed especially advantageous for the bulb shield to be held precisely in position using a positioning tool when producing the first adhesive bond. Precise positioning of the bulb shield in relation to the light-emitting surface is performed preferentially by means of a camera-based positioning system. Once the first adhesive has cured, the bulb shield is fixed in its exact position and the positioning tool can be removed and the second adhesive can be applied and cured without the danger of a shift in position.

Preferentially, the application of the first adhesive and the application of the second adhesive is performed from a front side of the bulb shield facing away from the light generation unit. This makes it especially easy to apply the respective adhesive. In particular, application of the respective adhesive can take place following the introduction of the bulb shield into the bearing structure. It is deemed especially advantageous for the first adhesive of the first adhesive bond to be a light-curing adhesive, for example a UV-curing adhesive. To cure the first adhesive, the first adhesive is irradiated with suitable light, for example UV light, from the front of the bulb shield facing away from the light generation unit.

Features and advantageous embodiments described in connection with the light module, apply correspondingly to the inventive method and vice versa.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
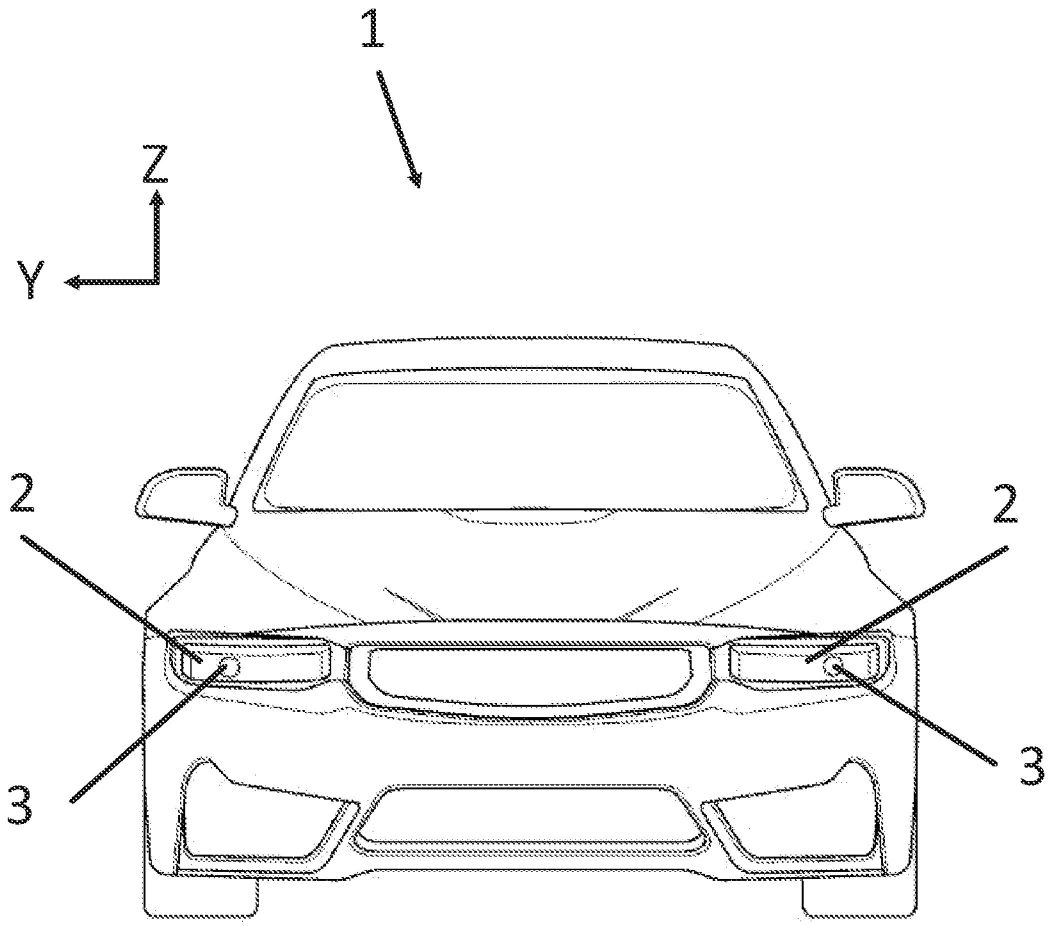
FIG. 1 is a front view of a motor vehicle.
Figure 2:
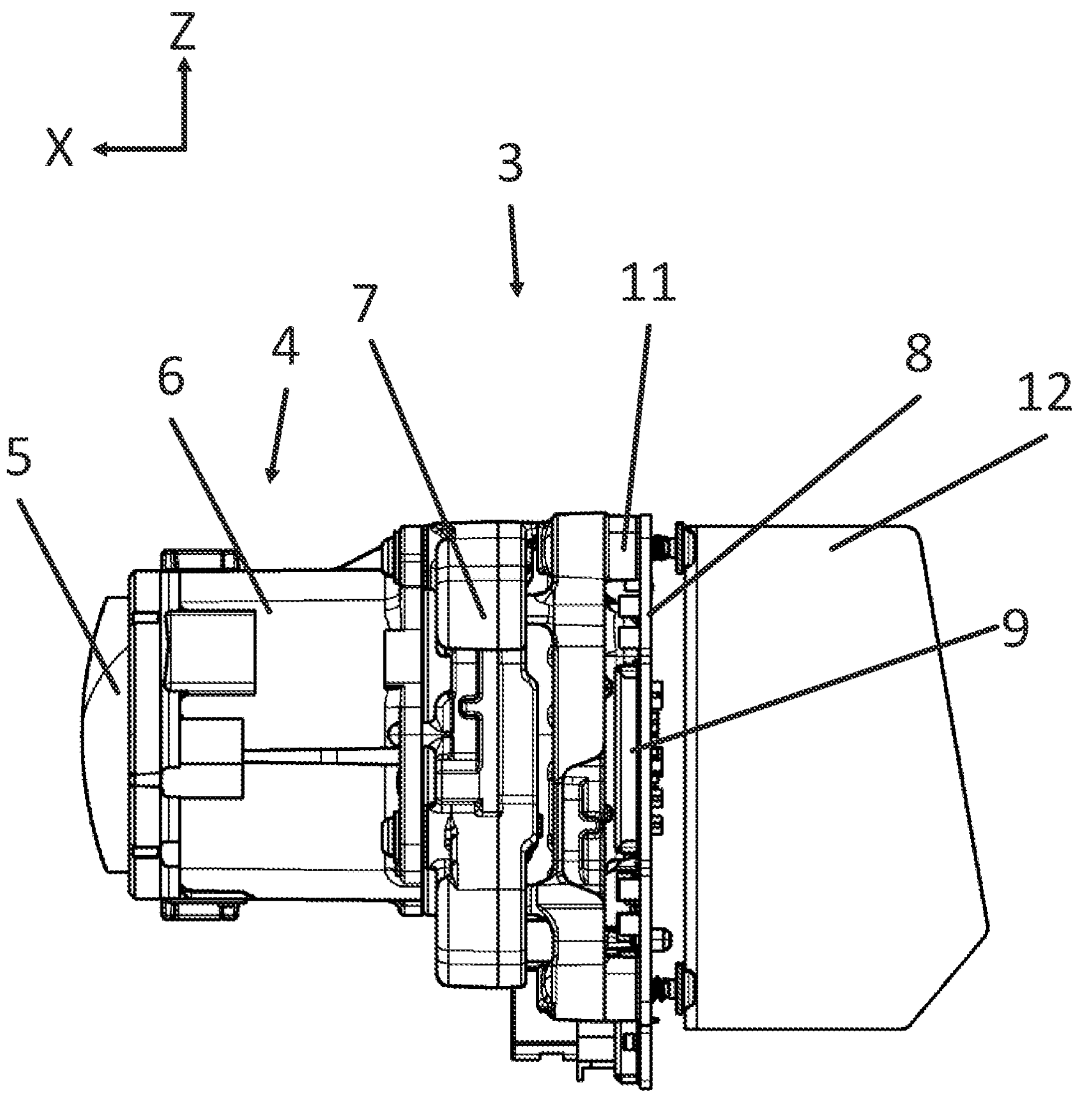
FIG. 2 is a side view of a light module of the motor vehicle according to FIG. 1.
Figure 3:
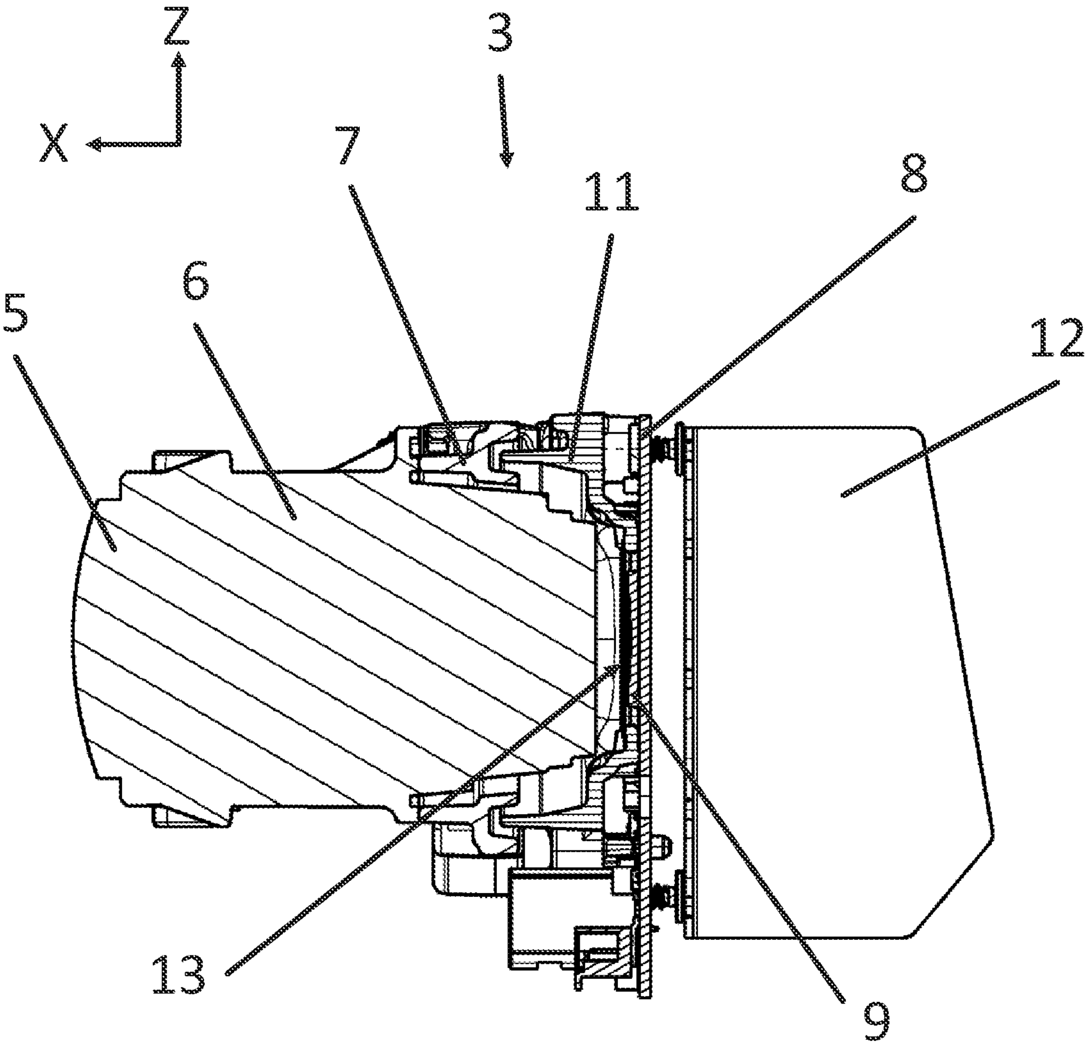
FIG. 3 is a cross-section of the light module according to FIG. 2 according to line III-III in FIG. 8.

FIG. 1 shows a front view of a motor vehicle 1. The motor vehicle 1 features two headlamps 2, where these headlamps 2 each has a headlamp housing and a headlamp cover lens and a light module 3. The headlamp 2 is a projection headlamp. Correspondingly, the light module 3 features a projection optic 4. The projection optic 4 features a lens holder 6 holding a lens 5. The lens holder 6 is fastened to an optic holder 7. The light module 3 further comprises a light generation unit, where the light generation unit features a light source carrier in the form of a rigid printed circuit board 8, where an LED module 9 is arranged on the printed circuit board 8, where the LED module 9 features a high-resolution LED matrix, where this LED matrix forms a light-emitting surface 10. The LED matrix in the form of an LED chip is surrounded by a silicone sealant 20, that in turn is surrounded laterally on the outside by a frame 21 made of plastic. In this respect, the silicone sealant 20 serves among other things to cover bonding wires (not shown in more detail).

The printed circuit board 8 is mounted to a single-part carrier frame 11 made of plastic, where a heat sink 12 is furthermore mounted to the carrier frame 11, the heat sink serving to cool the printed circuit board 8 and thus to cool the LED module 9.

A bulb shield 13 is arranged between the projection optic 4 and the LED module 9, where this bulb shield 13 completely covers the LED module 9, in particular the frame 21 and the silicone sealant 20 and partially covers the printed circuit board 8. The bulb shield 13 features a passage 14, where the passage 14 is arranged in such a way that the light emitted by the light-emitting surface 10 can enter the projection optic 4. The passage 14 and the light-emitting surface 10 essentially take the form of a rectangle, where the dimensions of the passage 14 are slightly smaller than the dimensions of the light-emitting surface 10, as can be seen in particular in FIGS. 6, 7 and 8 that show a top view of a subarea of the light module 3. The bulb shield 13 is connected to the carrier frame 11. For this purpose, the carrier frame 11 features a bearing structure 15, where the bearing structure 15 forms a surrounding contact face 16 for the bulb shield 13, where the bulb shield 13 makes direct contact with the contact surface 16 at a lower side of the bulb shield 13 facing towards the LED module 9.

The bulb shield 13 is fastened to the bearing structure 15. The fastening is effected by means of a first adhesive bond 17 and a second adhesive bond 18. As can be seen from FIG.

7, the first adhesive bond 17 features exactly three bonding spots. The second adhesive bond 18 is formed by exactly two linear adhesive bonds, where these linear bonds overlap the bonding spots of the first adhesive bond 17. This can be seen in particular from FIG. 8 and the cross-section view of FIG. 4. In the present case, the bearing structure 16 features exactly three indentations 19 for the first adhesive of the first adhesive bond 17, where such indentations 19 protrude laterally in a line of sight onto a front side of the bulb shield 13 opposite an outer edge of the bulb shield 13, as can be seen in particular from FIG. 6. In doing so, the bulb shield 13 partially overlaps the respective indentation 19. The first adhesive is introduced into these indentations 19, such that the bonding spots of the first adhesive bond 17 are formed in the area of the indentations 19. In the present case, the adhesives of the first and the second adhesive bond 17, 18 are applied on a front side of the bulb shield 13 facing away from the LED module 9. Only in the area of the indentations 19, do the adhesive bonds 17, 18 make contact with the bulb shield 13 at its circumferential outer surface.

The adhesives used to produce the first adhesive bond 17 and to produce the second adhesive bond 18 are different. The first adhesive of the first adhesive bond 17 is a fast curing UV-curing fixing adhesive. In contrast, the adhesive of the second adhesive bond 18 is a slow curing adhesive, namely a structural adhesive, a two-component adhesive in the present case.

The advantages of designing the light module 3 in such a way, namely fastening the bulb shield 13 to the carrier frame 11 stem, among other things, from the manufacturing technique described in the following. The method described in the following serves to fasten the bulb shield 13 in a precise position in relation to the light-emitting surface 10 of the LED module 9. The method is described in more detail with reference to FIGS. 5, 6, 7 and 8, where the aforementioned figures show a subarea of the light module 3 at different times in the method described in the following.

Figure 4:
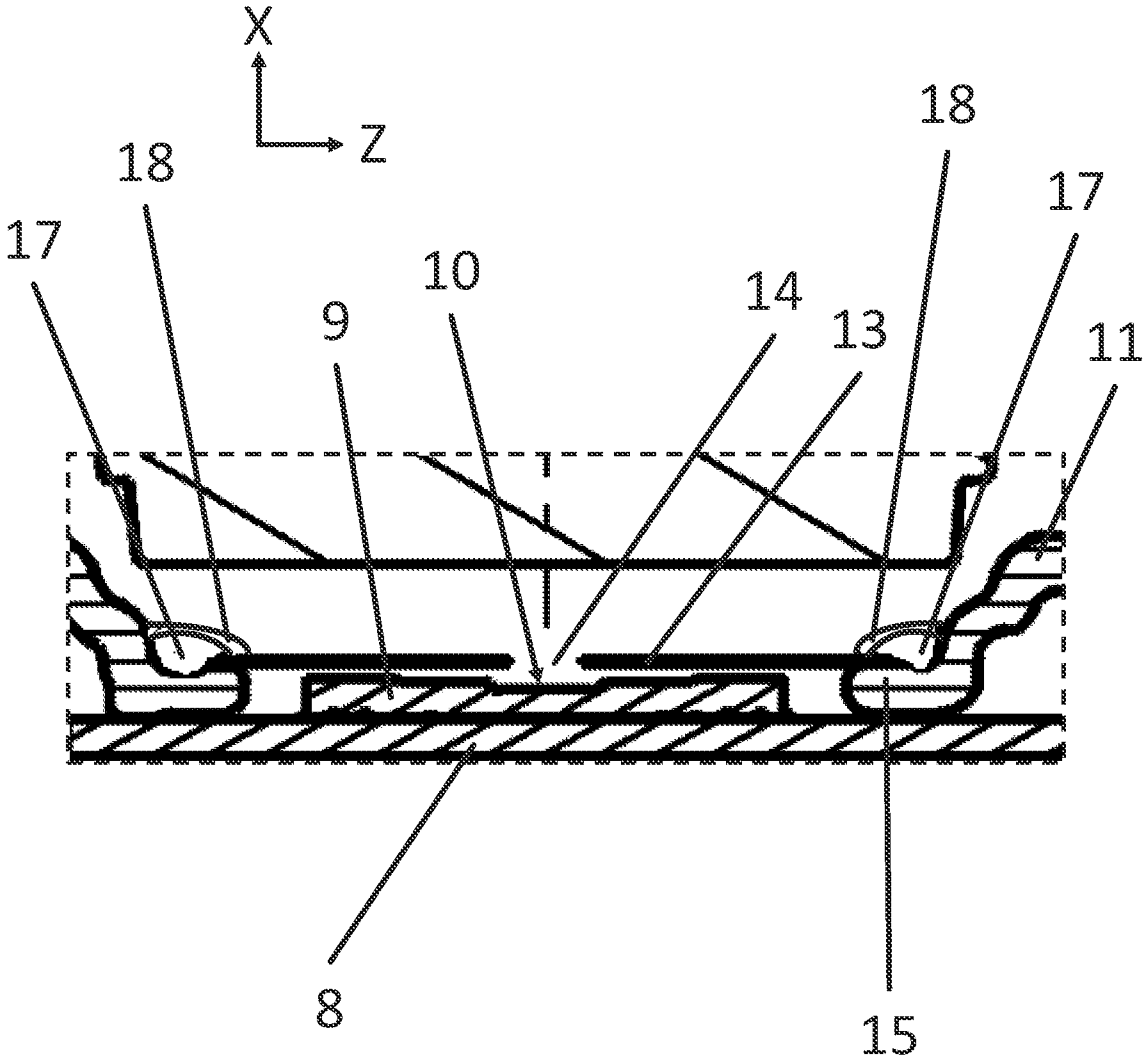
FIG. 4 is an enlarged representation of a subarea of FIG. 3.
Figure 5:
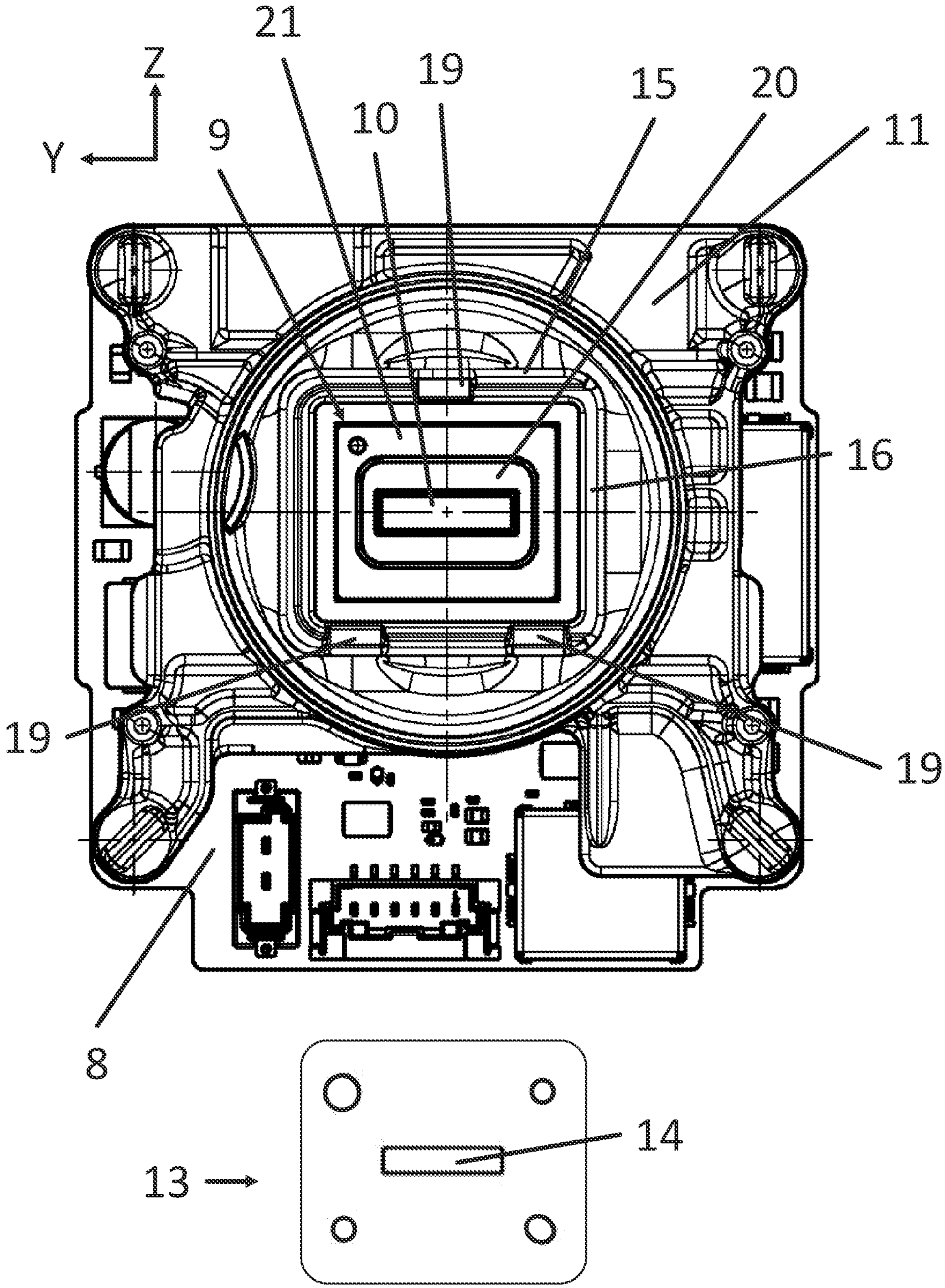
FIG. 5 is a top view of a subarea of the light module according to FIG. 2 together with a bulb shield during the installation of the bulb shield, in a first assembled state.
Figure 6:
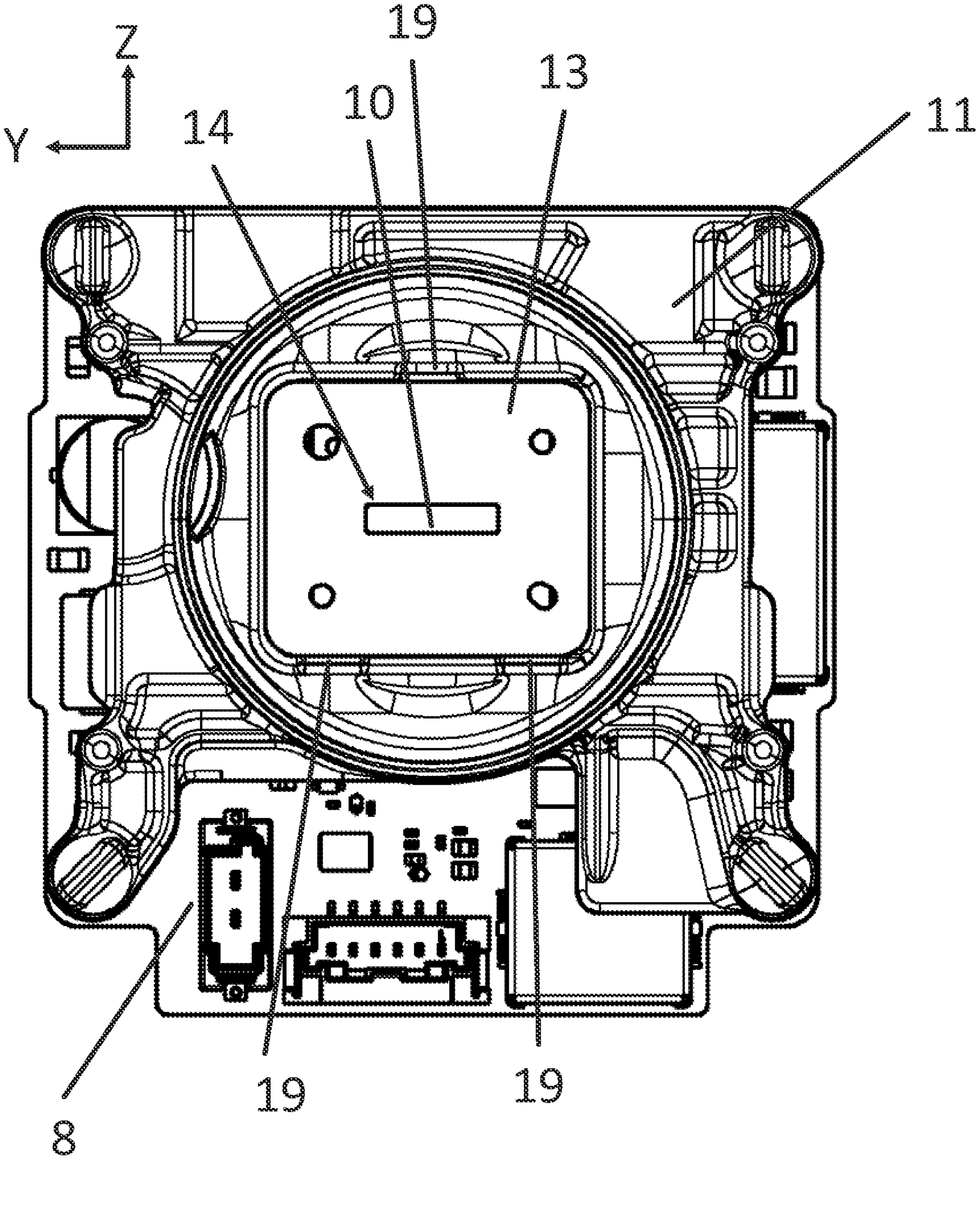
FIG. 6 shows the subarea according to FIG. 5 in a second assembled state.

First, the carrier frame 11 is provided with the printed circuit board 8 fastened to the same and the bulb shield 13. The LED module 9 is already fastened to the printed circuit board. The LED module 9 can, for example, be soldered to the printed circuit board 8. The carrier frame 11 and the printed circuit board 8, and thus the light-emitting surface 10, are fixed in position relative to each other. This assembled state or initial state is shown in FIG. 4. The light-emitting surface 10 and its position are, or have already been, detected using suitable means. The same applies correspondingly to the bulb shield 13 and the passage 14. The bulb shield 13 is subsequently introduced into the bearing structure 15 of the carrier frame 11 and positioned precisely such that the passage 14 of the bulb shield 13 is optimally positioned in relation to the light-emitting surface 10 of the LED module 9. The precise positioning of the bulb shield 13 can be performed using a camera-based system. FIG. 6 shows the subarea of the light module 3 following precise positioning of the bulb shield 13.

Figure 7:
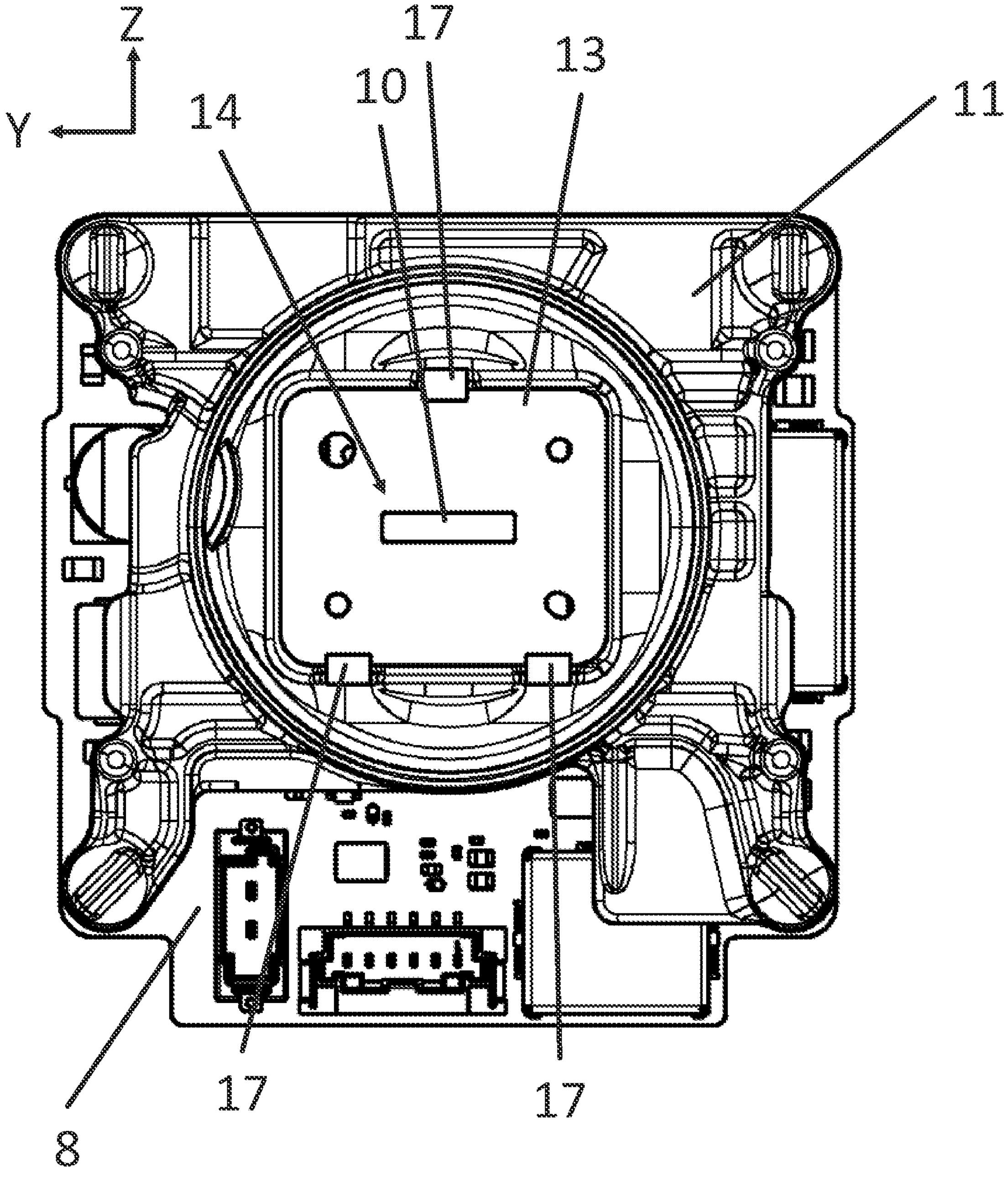
FIG. 7 shows the subarea according to FIG. 5 in a third assembled state.

In the next step, the first adhesive is introduced into the indentations 19 from the side of the carrier frame 11 facing towards the projection optic 4. The adhesive used is a UV-curing adhesive. The first adhesive is subsequently irradiated with UV light form the side facing towards the projection optic 4 for the purpose of hardening the first adhesive and thus for producing the first adhesive connection 17. Curing the UV adhesive by means of UV light takes place relatively quickly, as a rule within 3 to 15 seconds. This state is shown in FIG. 7. After curing of the first adhesive, the bulb shield 13 is fixed precisely in position so that any positioning means can be removed. After curing the first adhesive, the unit of printed circuit board 8, carrier frame 11 and bulb shield 13 can be handled as an assembly unit. This unit can for example be removed from a positioning tool serving to align the bulb shield 13.

Figure 8:
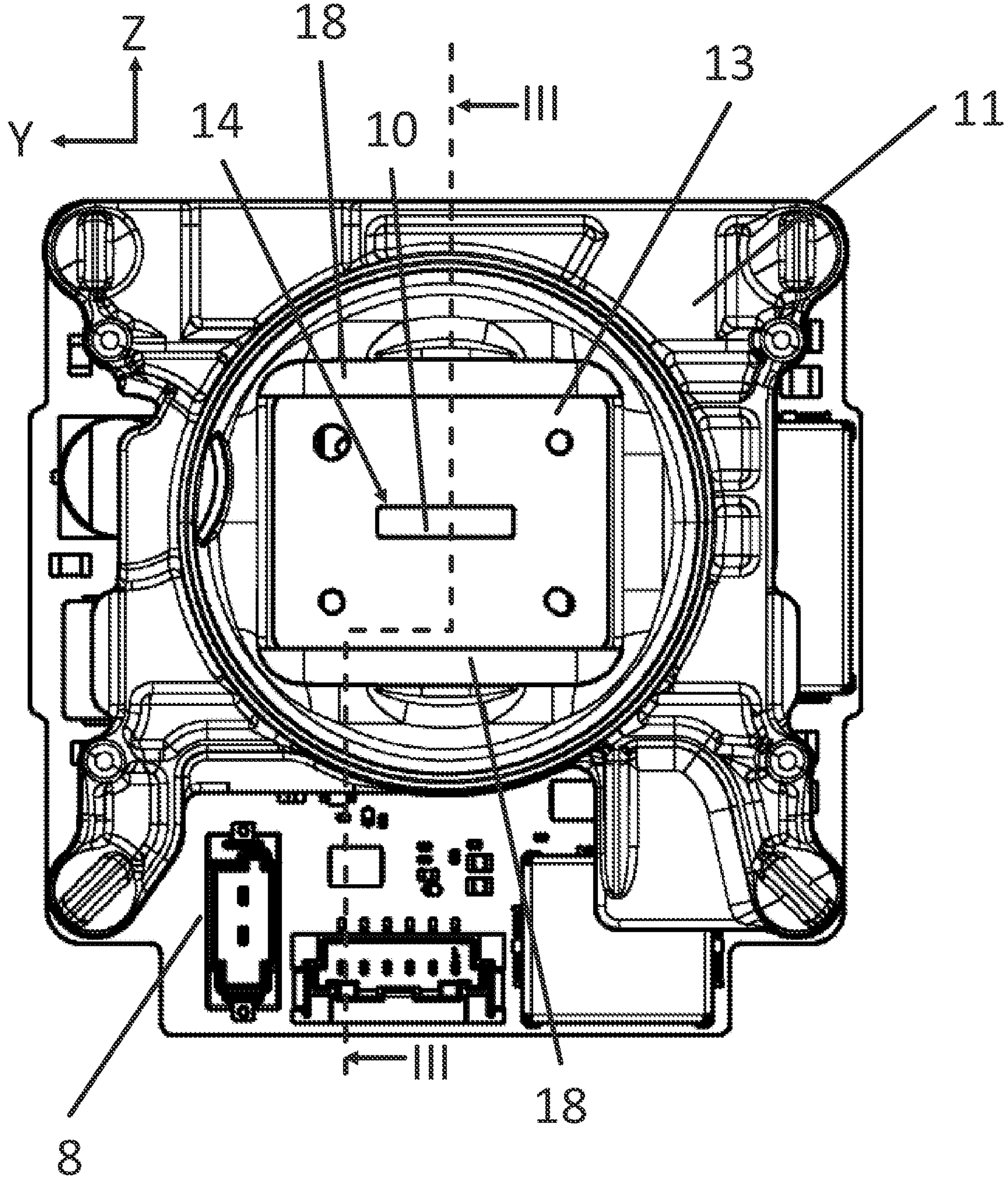
FIG. 8 shows the subarea according to FIG. 5 in a fourth assembled state.

For fastening the bulb shield 13 to the carrier frame in a long-term stable manner, the second adhesive is applied subsequent to curing of the first adhesive, namely in the form of two strips that overlap the bonding spots of the first adhesive bond 17. The second adhesive is a slow curing adhesive. As the first adhesive bond 17 already holds the bulb shield 13 in the optimum position or in the precise position, the bulb shield 13 does not have to be held in position by a positioning tool while the second adhesive slowly cures. After curing of the second adhesive, the second adhesive bond 18 is created that ensures long-term stable adhesion of the bulb shield 13 to the carrier frame 11. Application of the second adhesive is also performed from the side of the bulb shield 13 facing the projection optic 4. The final state of the assembly unit that, in the present case, is composed of the printed circuit board 8, the carrier frame and the bulb shield 13, is shown in FIG. 8.

For the purpose of forming the light module 3, the assembly unit composed of the optic carrier 7, the lens holder 6 and lens 5 is attached to carrier frame 11 and furthermore the heat sink 12 is connected to the carrier frame 11.

LIST OF REFERENCE NUMBERS

1 Motor vehicle
2 Headlamp
3 Light module
4 Projection optic
5 Lens
6 Lens holder
7 Optic carrier
8 Printed circuit board
9 LED module
10 Light-emitting surface
11 Carrier frame
12 Heat sink
13 Bulb shield
14 Passage
15 Bearing structure
16 Contact face
17 First adhesive bond
18 Second adhesive bond
19 Indentation
20 Silicone sealant
21 Frame

The invention claimed is:

1. A light module for an illumination device of a vehicle, the light module comprising:

a light generation unit for emitting light, the light generation unit including a light-emitting surface;

an optic for shaping the light emitted by the light generation unit; and a bearing structure;

where a bulb shield is arranged between the optic and the light generation unit for covering the light generation unit, the bulb shield including a passage for the light emitted by the light-emitting surface, where the bearing structure is for the bulb shield, where the bulb shield is glued to the bearing structure by a first adhesive bond and where the bulb shield is glued to the bearing structure by a second adhesive bond, where a first adhesive used to produce the first adhesive bond and a second adhesive used to produce the second adhesive bond are different.

2. The light module in accordance with claim 1, where the first adhesive of the first adhesive bond is a relative fast curing adhesive and where the second adhesive of the second adhesive bond is a relatively slow curing adhesive.

3. The light module in accordance with claim 1, where the first adhesive of the first adhesive bond is a light curing adhesive and/or where the second adhesive of the second adhesive bond is a multi-component adhesive.

4. The light module in accordance with claim 1, where the second adhesive bond overlaps the first adhesive bond on a side facing the optic.

5. The light module in accordance with claim 1, where the bulb shield makes direct contact with a contact face of the bearing structure at a lower side of the bulb shield facing the light generation unit.

6. The light module in accordance with claim 1, where the first adhesive bond is formed by several bonding spots and/or where the second adhesive bond includes one or several strip-shaped or linear bonds.

7. The light module in accordance with claim 1, where the bearing structure includes one or several indentations to accommodate the first adhesive, where the respective indentation protrudes laterally in a line of sight onto a front side of the bulb shield facing the lighting unit opposite an outer edge of the bulb shield.

8. A method of precisely fastening a bulb shield in position in relation to a light-emitting surface of a light generation unit of a light module, the method comprising the steps of:

providing a bearing structure, where the light-emitting surface is fixed in position in relation to the bearing structure, providing the bulb shield, where the bulb shield includes a passage for light emitted by the light-emitting surface, introducing the bulb shield into the bearing structure, positioning the passage of the bulb shield in relation to the light-emitting surface of the light generation unit, producing a first adhesive bond between the bulb shield and the bearing structure by applying and curing a first adhesive, producing a second adhesive bond between the bulb shield and the bearing structure by applying and curing a second adhesive, where the curing of the first adhesive takes place prior to the curing of the second adhesive.

9. The method in accordance with claim 8, where the application of the first adhesive and the application of the second adhesive is performed from a front side of the bulb shield facing away from the light generation unit.

10. The method in accordance with claim 8, where the first adhesive of the first adhesive bond is a light-curing adhesive, where for curing the first adhesive the first adhesive is irradiated with suitable light from the front side of the bulb shield facing away from the light generation unit.

* * * * *